UNITED STATES PATENT OFFICE.

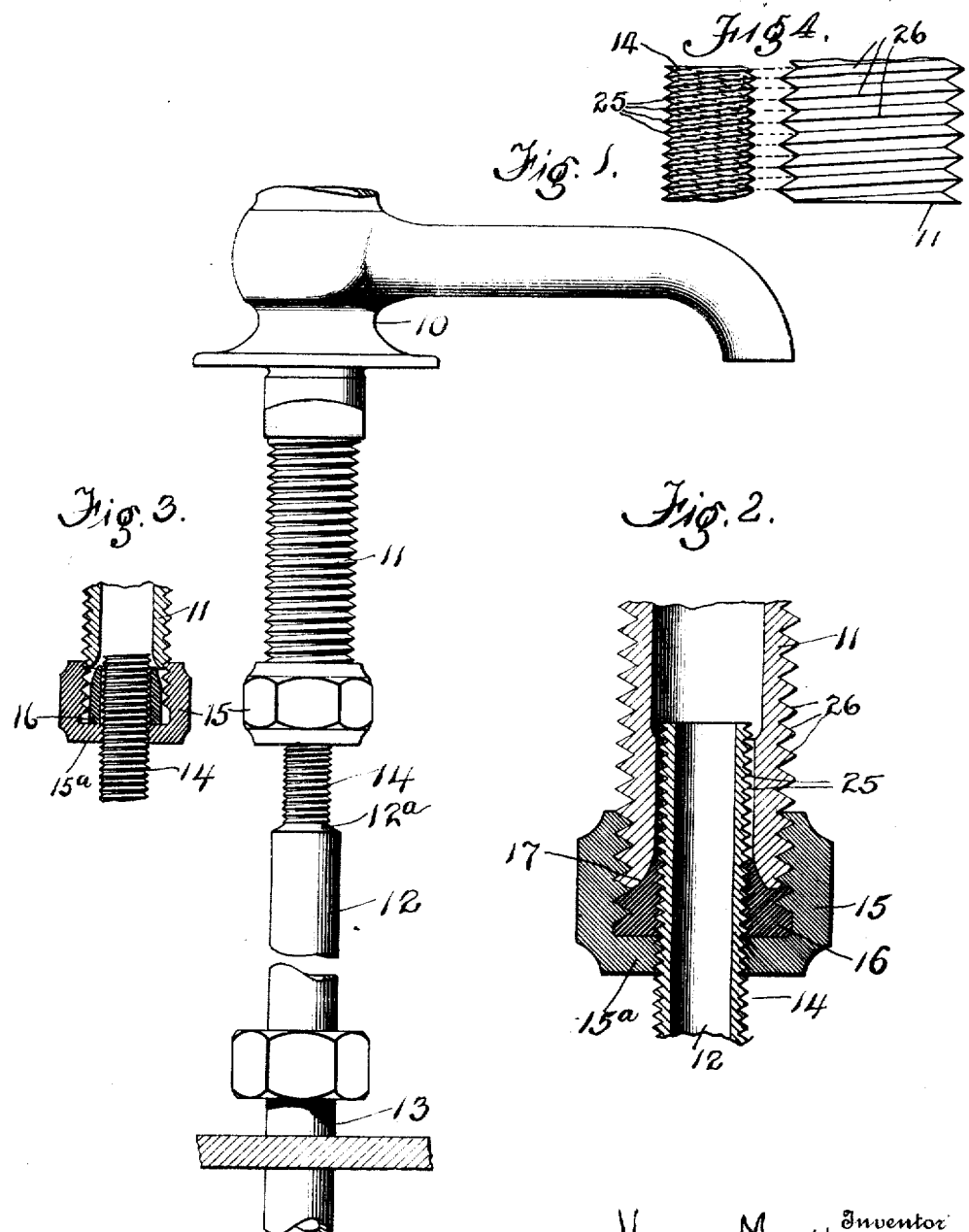

HENRY MUELLER, OF DECATUR, ILLINOIS; ORA B. MUELLER AND ADOLPH MUELLER EXECUTORS OF SAID HENRY MUELLER, DECEASED.

ADJUSTABLE PIPE CONNECTION.

1,163,679.  Specification of Letters Patent.  Patented Dec. 14, 1915.

Application filed July 14, 1910. Serial No. 571,971.

*To all whom it may concern:*

Be it known that I, HENRY MUELLER, a citizen of the United States, residing at Decatur, in the county of Macon and State of Illinois, have invented new and useful Improvements in Adjustable Pipe Connections, of which the following is a specification.

My invention relates to improvements in pipe couplings, and has more particular relation to couplings adapted for use in connection with lavatory fittings.

The principal objects of my invention are the following: 1. To provide a coupling for two tubular members by means of which said members, both screw-threaded, may be telescoped and connected without the use of a direct engagement of the two members one with the other. 2. To provide a coupling or connection for two pipes or members of different diameters and each screw-threaded, in which the washer or gasket is forced into engagement with opposing threaded surfaces of the coupling by the coupling operation, the members having no direct engagement one with the other. 3. To provide a connection of two screw-threaded members of different diameters having no direct engagement one with the other, with a coupling member adapted to engage with and be movable on the screw-threads of each of said members without affecting the relative positions of the two members during the movement of the third member on both members. 4. To provide a coupling means for two members of different diameters, both screw-threaded and having no direct engagement one with the other, the means providing a screw-threaded connection between the members through a third member screw-threaded to each of the other members, the screw-threading connection of said third member with the other members being arranged in such manner as to prevent relative longitudinal movement of the two members being connected during the movement of the third member. 5. To provide a coupling means for two members of different diameters, both screw-threaded and having no direct engagement one with the other, the means providing a screw-threaded connection between the members through a third member screw-threaded to each of the other members, and a compressible gasket or washer insertible within said third member and shaped to provide engagement of said washer or gasket with the screw-threads of said third member and one of the other members, during movements of the third member in a direction to complete the coupling. 6. The provision of a coupling member for two members to be connected, said coupling member and one of the remaining members being complementally formed to coöperate in changing the normal configuration of a soft metal or other gasket or washer in a manner to cause the latter to engage with screw-threads formed on the other of said members and of the coupling member. 7. To provide a coupling for two members of different diameters both externally screw-threaded, the member of smaller diameter having its normal external diameter greater than the internal diameter of the greater than the internal diameter of the other member, said members being freely telescopic when uncoupled, the telescoping being provided by reducing the thickness of the screw threaded end of the member of smaller diameter, the screw threads of the reduced end being proportioned to the threads of the other member to permit a running of a third or coupling member, having internal threads complemental to both members, over said members without affecting their relative positions when coupled. 8. To provide a coupling means for two externally-threaded tubular members capable of telescopic adjustment when uncoupled, without a requirement of rotation of either member, one of said members having its wall thickness throughout the threaded portion, less than the wall thickness of the other member throughout its similar portion.

Other and further objects of the invention are to provide a connection which is simple and efficient in operation, which requires no direct engagement between the two members to be connected, which is safe from "blowouts," which is durable in construction, which may be applied with ease and facility, in which the movement of the coupling member permits an axial movement of the two members relative to each other when uncoupled, but prevents such movement when coupled, without a rotative movement of said members, and which is relatively inexpensive.

To these and other ends the nature of which will be readily understood as my invention is hereinafter disclosed, said invention consists in the improved construction and combination of parts hereinafter fully described, illustrated in the accompanying drawings, and particularly pointed out in the appended claims.

In the accompanying drawings, in which similar reference characters indicate similar parts in each of the views, Figure 1 is a view in side elevation showing one embodiment of the present invention, and illustrating one way in which it may be applied as a part of a lavatory fitting. Fig. 2 is a longitudinal sectional view taken through the coupling, the view showing the parts on an enlarged scale, the soft metal gasket or washer being shown in its compressed or shaped condition provided by the relative movements of the coupling member and one of the pipes. Fig. 3 is a sectional view of the coupling showing the parts in the position they occupy prior to the movement of the coupling member to shape the gasket or washer. Fig. 4 is an elevation of the threaded portions of the two members being coupled, showing the relative arrangement of threads.

In the coupling of pipes or other members where one member is supplied in a definite length, and the meeting of service conditions is such as to require adjustments in the connection, it is often times the case that the connection is so situated as to prevent relative rotation of the members one to the other, as for instance, where the connection is used as a part of the mounting of lavatory members, the general practice being to provide exposed plumbing. Various ways of meeting these conditions have been provided, the general practice being to provide a joint wherein one member may telescope with respect to the other, the telescoping member having a smooth outer face to permit of a free axial movement of the member during the telescoping operation. The disadvantage of this latter type of construction lies in the fact that "blow-outs" are possible and occur with frequency. In the present invention this liability of "blow-outs" is eliminated by making the two members to be connected in a form to provide a relative telescopic movement, these members both being screw-threaded, but such screw-threaded structure does not provide direct engagement between the two members, both members being free to telescope; these screw-threaded members are connected by a third or coupling member which has screw-threads complemental to the threads of the other members, so that when said coupling member is in engagement with both members, said members are connected against separation excepting by the disconnection of the coupling member with one of the other members. In connection with this construction, I provide a gasket or washer, which, by the movement of the nut or coupling member is compressed or shaped to cause the packing material to flow radially and engage the threads of the coupling member and the telescoping member, thereby placing a sealing member in the path of the fluid attempting to escape or leak through either of the threaded connections. To produce this result I form one of the members to be connected and the coupling member in such manner as to provide complemental means which will force a flow of material of the gasket or washer in the proper directions, and for the purpose of producing the proper compression, I preferably form the screw-threads of the two members to be connected in such manner that the threads of the inner member will provide, during a single revolution of the coupling member, a length of relative axial movement of the inner and coupling members exactly equal to the length of similar movement of the outer and coupling members, with the result that while both members to be coupled are free to telescope when uncoupled, the engagement of the threads of the coupling member with the threads of the other members immediately locks the members being coupled against relative axial movement, thereby permitting an initial positioning of the members relative to each other and firmly locking them in such position and at the same time shaping and positioning the packing within the coupling.

In the drawings, I have illustrated one embodiment of the invention, the several views showing it as applied in connection with a basin fitting, this, however, being simply illustrative and not as indicating limitations in the use of the connection, it being obvious that the invention may be employed in other ways and for other purposes, with equal facility.

In Fig. 1, 10 designates the basin fitting having the threaded shank 11; 12 designates the supply pipe having an operative connection with the service pipe 13, the upper end of the supply pipe 12 being preferably but not necessarily reduced in diameter and externally screw-threaded, as at 14, the greatest diameter of the threaded-end 14 being not greater than the inner diameter of the shank 11 at the lower end of the latter, these two parts being arranged to permit the threaded end 14 to telescope within the shank 11, as indicated in Fig. 2, there being no direct engagement between the screw-threads of the threaded end 14 and the inner periphery of the shank 11.

15 designates a coupling member, shown herein as in the form of a nut somewhat similar in shape to a gland-nut, said nut being screw-threaded in two separate planes to provide screw-threaded engagement of the nut with both of the other members 11 and 12, the threads of the nut being formed complemental to the threads of said members.

16 designates a soft-metal or composition gasket or washer of a suitable type, and which, as shown in Fig. 3, is preferably of a size or shape which will permit it to be placed within the nut 15 without requiring manipulation with respect to either the threads of the nut or those of the supply pipe 12, the latter being in position within the nut when the washer is inserted. As will be readily understood, a coupling of the nut with the shank 11 will cause the end 15ᵃ of the nut to approach the end of the shank 11, with the result that the gasket or washer will be compressed and re-shaped, causing the metal to flow radially and enter the threads of the end 14 and the nut 15. For the purpose of more efficiently forcing this radial flow of the material of the washer or gasket, I preferably but not necessarily flare the outer end of the shank 11, as indicated at 17, this form tending to force the metal inwardly onto the screw-threads of the supply 12. It will be readily understood that the threaded movement of the nut causes the flow of metal to be produced by the end 15ᵃ and flared end 17 (if the latter be employed; otherwise by the end of the pipe 11) by compressing action and thereby insures that the space between the member 12 and the nut will be absolutely filled by the gasket or washer, eliminating the liability of leakage which might be produced by inaccuracies in the metal of the members or the formation of a screw-thread.

As will be readily understood, the ability of the members to telescope necessitates the use of members of different diameters. As the necessities of installation are generally such as require an accurate adjustment prior to the coupling, this adjustment must remain during the coupling operation, with the result that the movement of the coupling nut axially must be equal in length on both members. This equal length of movement may be produced by making the threads of the members to be coupled of equal size and pitch, but in such case the wall thickness of the inner member should substantially equal that of the outer member, a result which would materially restrict the internal diameter of the pipe. To restrict this requirement, without affecting the pitch and size of the threads of the outer member, I preferably make the screw-threads of the inner member 12 greater in number (but of the same pitch) to the linear inch using, as an example, a double thread 25, on the member 12 to each single thread 26 on the member 11, the threads 25 entering on diametrically opposite sides of the member 12, causing the threads of one side to alternate with the threads of the other side in completing the thread, as indicated in Fig. 4. As a result, a single revolution of the member 15 will cause the former to run exactly the same distance on both members 11 and 12. As the threads 25 are of less depth than the threads 26, the wall thickness of member 12 may be reduced without affecting strength, and owing to the greater number of grooves, the packing afforded by the gasket 16 will not have its efficiency affected. And as will be readily understood, the use of the threads 25 with the ability to use a reduced wall thickness enables the employment of a member 12 of reasonable thickness and, if desired, of an external diameter greater than the internal diameter of member 11, the end 14 of the member 12 in such case being reduced in thickness, a shoulder 12ᵃ being formed at the point of juncture of the main portion of the member and the threaded end.

As will be readily understood, the shank 11 may or may not be formed integral with the remainder of the fitting, the disclosure herein, as heretofore pointed out, is simply illustrative in this respect, and I desire it understood that the term "fitting" employed herein contemplates a fitting connected to a supply pipe irrespective of the number or character of the parts of which it is composed. As will be obvious the connection is also applicable for use for connecting two pipes of any type or a single pipe and a member adapted to telescope therein without direct engagement.

While I have herein shown one embodiment of the invention, I reserve the right to make such changes and modifications therein as may be required under service conditions so long as these changes and modifications fall within the spirit and scope of the invention as expressed in the following claims.

What I claim is:—

1. A coupling comprising an exteriorly threaded shank having a flaring inner wall at its end, a supply pipe formed of thin annealed metal provided with a reduced portion having external threads and slidably engaging in the end of the shank, the threads of said reduced portion being a multiple of the threads of the shank, a coupling member having its ends of different diameters and being internally threaded to engage over the shank and the supply pipe respectively, and a packing disposed in the coupling member about the supply pipe, said coupling member being adapted for longitudinal adjustment over said reduced portion of the supply pipe, said coupling member further being adapted to be turned up on the end of the shank whereby the packing is compressed against the flaring wall of the shank and into the threads of said reduced portion, the coupling member moving uniformly over the shank and the supply pipe.

2. In an adjustable pipe coupling, the combination with an exteriorly threaded pipe, of a second pipe adapted to telescope in said first-named pipe and having exterior threads thereon of like pitch but in multiple of the threads on said first-named pipe, and a coupling member having complementary threads to engage the threads on both of said pipes so as to be movable thereon to secure a tight joint without affecting the adjusted telescopic relation of said pipes.

3. In an adjustable supply pipe coupling, the combination of an exteriorly threaded shank, of a supply pipe formed of thin metal adapted to telescope in said shank and having threads thereon of like pitch but in multiple of the threads on said shank, a coupling nut having complementary threads to engage the threads on both of said pipes so as to be movable thereon to secure a tight joint without affecting the adjusted telescopic relation of said pipes, and a packing adapted to be compressed between the end of said shank and said nut about said threaded supply pipe.

In testimony whereof I have hereunto set my hand in presence of two subscribing witnesses.

HENRY MUELLER.

Witnesses:
  LEONARD F. McKIBBEN,
  WILLIAM R. BIDDLE.

It is hereby certified that in Letters Patent No. 1,163,679, granted December 14, 1915, upon the application of Henry Mueller, of Decatur, Illinois, for an improvement in "Adjustable Pipe Connections," an error appears in the printed specification requiring correction as follows: Page 1, strike out line 75; and that the said Letters Patent should be read with this correction therein that the same may conform to the record of the case in the Patent Office.

Signed and sealed this 11th day of January, A. D., 1916.

[SEAL.]

J. T. NEWTON,
*Acting Commissioner of Patents.*

Cl. 137—28.